(12) United States Patent
Jackson

(10) Patent No.: US 8,657,944 B2
(45) Date of Patent: Feb. 25, 2014

(54) INKJET INK

(75) Inventor: Christian Jackson, Wilmington, DE (US)

(73) Assignee: E I du Pont de Nemours and Company, Wilmington, DE (US)

(*) Notice: Subject to any disclaimer, the term of this patent is extended or adjusted under 35 U.S.C. 154(b) by 831 days.

(21) Appl. No.: 12/148,187

(22) Filed: Apr. 16, 2008

(65) Prior Publication Data

US 2009/0056588 A1 Mar. 5, 2009

Related U.S. Application Data

(60) Provisional application No. 60/925,370, filed on Apr. 20, 2007.

(51) Int. Cl.
*C09D 11/00* (2006.01)

(52) U.S. Cl.
USPC .................. 106/31.78; 106/31.85; 106/31.86

(58) Field of Classification Search
USPC .................................... 106/31.03, 31.13, 31.6
See application file for complete search history.

(56) References Cited

U.S. PATENT DOCUMENTS

| | | | |
|---|---|---|---|
| 4,597,794 A | 7/1986 | Ohta et al. | |
| 5,085,698 A | 2/1992 | Ma et al. | |
| 5,519,085 A * | 5/1996 | Ma et al. | 524/503 |
| 6,136,890 A * | 10/2000 | Carlson et al. | 523/160 |
| 6,143,807 A * | 11/2000 | Lin et al. | 523/161 |
| 6,866,379 B2 * | 3/2005 | Yau et al. | 347/100 |
| 2002/0135650 A1 | 9/2002 | Nagal et al. | |
| 2002/0185038 A1 | 12/2002 | Marritt | |
| 2003/0051632 A1 | 3/2003 | Yoon et al. | |
| 2005/0124726 A1 | 6/2005 | Yatake et al. | |

FOREIGN PATENT DOCUMENTS

| | | |
|---|---|---|
| EP | 1270690 A1 | 1/2003 |
| EP | 416021 A1 | 5/2004 |
| EP | 1548034 A1 | 6/2005 |
| EP | 15498034 A1 | 6/2005 |
| GB | 2364322 A2 | 1/2002 |
| WO | 97/43351 A | 11/1997 |
| WO | 2006/082160 A | 8/2006 |

* cited by examiner

*Primary Examiner* — Bijay Saha
(74) *Attorney, Agent, or Firm* — Simon L. Xu

(57) ABSTRACT

The present invention pertains to an aqueous inkjet ink comprising pigment stabilized to dispersion with anionic dispersant, wherein cations present in the ink comprise a mixture, in a certain molar ratio, of lithium and one or more of sodium, potassium, rubidium and/or cesium. The inks exhibit greatly extended latency.

10 Claims, No Drawings

INKJET INK

CROSS-REFERENCE TO RELATED APPLICATION

This application claims priority under 35 U.S.C. §119 from U.S. Provisional Application Ser. No. 60/925,370 (filed Apr. 20, 2007), the disclosure of which is incorporated by reference herein for all purposes as if fully set forth.

BACKGROUND OF THE INVENTION

The present invention pertains to inkjet ink and more particularly to an aqueous inkjet ink comprising pigment stabilized with anionic dispersant, and having cations present in the ink which comprise a certain mixture, in a certain molar ratio, of lithium and one or more of sodium, potassium, rubidium and/or cesium. The inks exhibit greatly extended latency.

Inkjet printing is a non-impact printing process in which droplets of ink are deposited on a substrate, such as paper, to form the desired image. The droplets are ejected from a printhead in response to electrical signals generated by a microprocessor. Inkjet printers offer low cost, high quality printing and have become a popular alternative to other types of printers.

An ink-jet ink is characterized by a number of necessary properties, including color, jetability, decap time (latency), drying time and shelf-life, among others. There is, however, often a tradeoff between these properties because improving one property can result in the deterioration of another property.

The decap time of the ink is the amount of time a printhead can be left uncapped and idle and still fire a drop properly—that is to say without misdirection, loss of color or unacceptable decrease of velocity. Decap is sometimes referred to in the art as "latency" and these two terms will be used interchangeably.

Because not all the nozzles of the printhead print all the time, a printer service routine requires the idle nozzles to discharge ("spit") on a regular basis into the waste container ("spittoon") to avoid printing defects. It is desirable, however, to service the printhead as infrequently as possible as it is wasteful of ink and slows print speeds. To reduce need for servicing, an ink will preferably have a long decap time.

Contributing to decap problems is the trend for printheads to fire smaller drops to increase image resolution. The increased surface area to volume to the smaller drops allows faster evaporation of volatile vehicle components at the nozzle face and thereby tends to decrease decap time.

Both soluble (dye) and insoluble (pigment) colorants have been used in inkjet inks and both have certain advantages. Pigments are advantageous because they tend to provide more water-fast and light-fast images than dye inks.

In aqueous inkjet ink formulations, pigments are in the form of finely divided particles which must be stabilized to dispersion in the ink vehicle. Stabilization of the pigment particles can be accomplished by treatment with a dispersing agent, such as a surfactant or polymeric dispersant. Alternatively, pigment particles can be stabilized by surface modification to form a so-called "self-dispersible" or "self-dispersing" pigment which, as the name implies, are stable to dispersion without a dispersing agent. Treatment of pigments with dispersant tends to be the more universally applicable method of stabilization.

U.S. Pat. No. 4,597,794 discloses aqueous inkjet inks with pigment and anionic polymeric dispersant. Representative counterions include alkali metals, such as Na and K, and aliphatic and alcoholic amines.

U.S. Pat. No. 6,143,807 discloses aqueous inkjet ink comprising pigment and a dispersant which is a reaction product of an aldehyde and a naphthalene sulfonate salt. Counter-ions for the dispersant salt include Rb, Cs, K, Na, Li, substituted and unsubstituted ammonium. The ink has a latency more than 10 seconds in a high resolution printhead.

U.S. Pat. Nos. 5,085,698 and 5,519,085 disclose aqueous inkjet ink formulations with block copolymer dispersants. The dispersants are neutralized with alkanolamines and alkali metal hydroxide.

U.S. Pat. No. 6,866,379 discloses aqueous inkjet ink comprising pigment, dispersed with an oleoyl methyl taurine salt dispersant, and a water-reducible addition polymer neutralized by an alkaline metal hydroxide. In one example, the dispersant was in the potassium salt form and the polymer was neutralized with lithium hydroxide. However, the molar ratio of lithium to potassium is outside range of the present invention.

Although current pigmented inkjet inks are being successfully jetted, there is still a need in the art for, and it is an object of this invention to provide, pigmented inkjet ink with longer decap time that still retains other beneficial print properties.

SUMMARY OF THE INVENTION

In accordance with an objective of this invention, there is provided an ink-jet ink comprising an aqueous vehicle, colorant and a first and second cationic species. The colorant comprises a pigment stabilized to dispersion in the aqueous vehicle with an anionic dispersant. The first cationic species consists of $Li^+$, and has a molar concentration per unit weight of ink of M1. The second cationic species is any member or combination of members selected from the group consisting of $Na^+$, $K^+$, $Rb^+$ $Cs^+$, and has a molar concentration per unit weight of ink of M2. The molar ratio of M1 to Mtot satisfies equation 1 as follows:

$$0.1 < M1/Mtot < 0.5 \qquad (\text{eq. 1})$$

and Mtot is the cumulative molar concentration of first and second cationic species per unit weight of ink (Mtot=M1+M2).

In a preferred embodiment, the aqueous vehicle comprises water and a first and second humectant. The first humectant consists of 2-pyrrolidone and the second humectant is selected from any member or combination of members of the group consisting of ethylene glycol, diethylene glycol and triethylene glycol.

By adjusting the ratio of first and second cationic species, in accordance with the teachings provided herein, greatly enhanced latency can be achieved when compared to inks of similar composition comprising only second cationic species or first cationic species.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

DETAILED DESCRIPTION OF THE PREFERRED EMBODIMENTS

The inkjet ink of the present invention, as well as inkjet inks in general, are comprised of vehicle, colorant and optionally other ingredients such as surfactants, binders, buffers, biocides and so forth. The ink vehicle is the liquid carrier (or medium) for the colorant and optional additives. The ink colorant refers to any and all species in the ink that provide color. The ink colorant can be a single colored species or a plurality of colored species collectively defining the final ink color. Typical colorants known in the art can be soluble (dye) or insoluble (pigment) in the vehicle.

Vehicle

The term "aqueous vehicle" refers to a vehicle comprised of water and one or more organic, water-soluble vehicle components commonly referred to as co-solvents or humectants. Sometimes in the art, when a co-solvent can assist in the penetration and drying of an ink on a printed substrate, it is referred to as a penetrant.

Examples of water-soluble organic solvents and humectants include: alcohols, ketones, keto-alcohols, ethers and others, such as thiodiglycol, sulfolane, 2-pyrrolidone, 1,3-dimethyl-2-imidazolidinone and caprolactam; glycols such as ethylene glycol, diethylene glycol, triethylene glycol, tetraethylene glycol, propylene glycol, dipropylene glycol, tripropylene glycol, trimethylene glycol, butylene glycol and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, diethylene glycol monoethyl ether; lower dialkyl ethers of polyhydric alcohols, such as diethylene glycol dimethyl or diethyl ether; urea and substituted ureas.

Examples of co-solvents that commonly act as penetrants include higher alkyl glycol ethers and/or 1,2-alkanediols. Glycol ethers include, for example, ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. 1,2-Alkanediol penetrants include linear, for example, 1,2-($C_5$ to $C_8$)alkanediols and especially 1,2-pentanediol and 1,2-hexanediol.

The aqueous vehicle typically will contain about 65 wt % to about 95 wt % water with the balance (i.e., about 35% to about 5%) being organic water-soluble vehicle components. The amount of aqueous vehicle in the ink is typically in the range of about 75 wt % to about 99.8 wt % of the total ink.

In one embodiment of the present invention, the aqueous vehicle comprises a first humectant and second humectant. The first humectant consists of 2-pyrrolidone. The second humectant is any one or combination of members of the group consisting of ethylene glycol, diethylene glycol and triethylene glycol.

The amount of first humectant in the final ink, is generally between about 1 wt % and about 35 wt % and more typically between about 2 wt % and about 30 wt %. In a preferred embodiment, the first humectant is present in the ink at levels in the range of about 4 wt % to about 25 wt %.

The amount of second humectant, is generally between about 1 wt % and about 35 wt % and more typically between about 2 wt % and about 30 wt %. In a preferred embodiment, the second humectant is present in the ink at levels of between about 4 wt % to about 25 wt %.

The percentage of first and second humectants herein above is weight percent based on the total weight of ink.

Colorant

The ink colorant comprises a pigment. Raw pigment is insoluble and typically non-dispersible in the ink vehicle and must be treated in order to form a stable dispersion. According to the present invention, the pigment is stabilized to dispersion in the aqueous vehicle by treatment with a dispersant, in particular an anionic dispersant. The term "dispersant" as used herein is generally synonymous with the terms "dispersing agent" and "suspending agent" which are also found in the art.

Examples of pigments with coloristic properties useful in inkjet inks include: (cyan) Pigment Blue 15:3 and Pigment Blue 15:4; (magenta) Pigment Red 122 and Pigment Red 202; (yellow) Pigment Yellow 14, Pigment Yellow 74, Pigment Yellow 95, Pigment Yellow 110, Pigment Yellow 114, Pigment Yellow 128 and Pigment Yellow 155; (red) Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264; (green) Pigment Green 1, Pigment Green 2, Pigment Green 7 and Pigment Green 36; (blue) Pigment Blue 60, Pigment Violet 3, Pigment Violet 19, Pigment Violet 23, Pigment Violet 32, Pigment Violet 36 and Pigment Violet 38; and (black) carbon black. Colorants are referred to herein by their "C.I." designation established by Society Dyers and Colourists, Bradford, Yorkshire, UK and published in The Color Index, Third Edition, 1971. Commercial sources of pigment are generally well known in the art.

The dispersant can be any suitable anionic dispersant such as, for example, those disclosed in U.S. Pat. Nos. 4,597,794; 5,085,698 and 5,519,085; and 6,143,807 herein before referenced. Also, the dispersant can be, for example, those anionic dispersants disclosed in U.S. Pat. Nos. 5,708,095 and 6,136,890; and U.S. Patent Pub. No. US2005/0090599.

According to a preferred embodiment of the present invention, the anionic moieties of the anionic dispersant are predominately carboxyl groups, and in another preferred embodiment, the anionic moieties of the anionic dispersant consist essentially of carboxyl groups only.

To prepare a dispersion, the pigment and dispersant are premixed and then dispersed or deflocculated in a milling step. The premixture includes an aqueous carrier medium (such as water and, optionally, a water-miscible solvent) when the milling step involves a wet milling operation. The milling may be accomplished in a 2-roll mill, media mill, a horizontal mini mill, a ball mill, an attritor, or by passing an aqueous premix through a plurality of nozzles within a liquid jet interaction chamber at a liquid pressure of at least 5,000 psi to produce a uniform dispersion of the pigment particles in the aqueous carrier medium (microfluidizer). Alternatively, the concentrates may be prepared by dry milling the dispersant and the pigment under pressure. The media for the media mill is chosen from commonly available media, including zirconia, YTZ® (Nikkato Corporation, Osaka, Japan), and nylon. These various dispersion processes are in a general sense well-known in the art, as exemplified by U.S. Pat. Nos. 5,022, 592, 5,026,427, 5,310,778, 5,891,231, 5,679,138, 5,976,232 and U.S. Patent Pub. No. 2003/0089277. The pigment dispersion as made is typically in a concentrated form (dispersion concentrate), which is subsequently diluted with a suitable liquid containing the desired additives to make the final ink.

The range of useful particle size after dispersion is typically about 0.005 micron to about 15 micron. Preferably, the pigment particle size should range from about 0.005 to about 5 micron and, most preferably, from about 0.005 to about 1 micron. The average particle size as measured by dynamic light scattering is less than about 500 nm, preferably less than about 300 nm.

The levels of pigment employed in formulated inks are those levels needed to impart the desired optical density to the printed image. Typically, pigment levels are in the range of about 0.01 wt % to about 10 wt %, and more typically from about 1 wt % to about 9 wt %.

The ink colorant prescribed in the present invention must comprise pigment stabilized with anionic dispersant, but may additionally comprise other colored species. In a preferred embodiment, the colorant consists essentially of only pigment stabilized to dispersion in the aqueous ink vehicle with anionic dispersant, which is to say that effectively any and all colored species in the ink are pigments so stabilized.

Other Ingredients (Additives)

Other ingredients, additives, may be formulated into the inkjet ink, to the extent that such other ingredients do not interfere with the stability and jetability of the ink, which may be readily determined by routine experimentation. Such other ingredients are in a general sense well known in the art.

Commonly, surfactants are added to the ink to adjust surface tension and wetting properties. Suitable surfactants include ethoxylated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont). Surfactants are typically used in amounts up to about 5% and more typically in amounts of no more than 2%.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N', N'',N''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Salts other than the chelators may also be used, for example, to adjust the cation ratio. Biocides may be used to inhibit growth of microorganisms.

Polymers (sometimes referred to as binders) may be added to the ink to improve durability. The polymers can be soluble in the vehicle or dispersed, and can be ionic or nonionic.

Preferred anionic polymers are carboxyl groups-containing polymers having carboxylic acid groups (in the acid form or neutralized as "carboxylate") incorporated in the polymer. The polymer may contain other ionic or nonionic hydrophilic groups such as ether, hydroxyl and amide groups.

Soluble polymers may include linear homopolymers, copolymers or block polymers, they also can be structured polymers including graft or branched polymers, stars, dendrimers, etc. The dispersed polymers may include, for example, latexes and hydrosols. The polymers may be made by any known process including but not limited to free radical, group transfer, ionic, RAFT, condensation and other types of polymerization. They may be made by a solution, emulsion, or suspension polymerization process. Classes of soluble/dispersible carboxyl groups-containing polymers include acrylic, styrene-acrylic and polyurethane polymers.

When soluble polymer is present, the level is commonly between about 0.01 wt % and about 3 wt %, based on the total weight of ink. Upper limits are dictated by ink viscosity or other physical limitations.

Cations

According to the present invention, an ink will contain a first cationic species ($Li^+$) and a second cationic species (one or any combination of $Na^+$, $K^+$, $Rb^+$ and $Cs^+$). By adjusting the relative ratio of first and second cationic species, as prescribed herein, greatly enhanced decap can be obtained when compared to a similar ink comprising only second cationic species or only first cationic species.

The molar concentration of first cationic species per unit weight of ink is referred to as M1. The molar concentration of second cation species per unit weight of ink is referred to as M2. The cumulative molar concentration of first and second cationic species per unit weight of ink is Mtot (M1+M2=Mtot).

The Mtot is preferably equal to or greater than 90% of the molar content of anionic groups on the dispersant, per unit weight of ink (referred to a M_anion). The molar content of anionic dispersant groups in the ink is a function of the acid number of the dispersant, the ratio of pigment to dispersant (P/D) and the amount (weight percent) of pigment dispersion in the ink.

The first and second cations referred to herein must be in an "available" form, which means they are soluble or at least labile in the vehicle.

The range of ratios of first and second cations yielding best (longest) decap ("optimum ratio") can be fairly narrow. And, the optimum ratio can shift depending on dispersant type, pigment and which cations are present. With teachings provided herein, one skilled in the art can readily determine appropriate cation levels and ratios. In general, the optimum M1/Mtot ratio will be between about 0.1 and about 0.5. More typically the ratio of M1 to Mtot is between about 0.2 and about 0.45.

Sodium is prevalent in the environment, and sodium cations may be detectable in an ink (at greater than 1 or 2 parts per million, for example) even when not deliberately added. The levels of other alkali metals and ammonium, however, are typically nil (e.g. less than about 1 or 2 ppm) without deliberate addition.

Sources of cations includes at least the counterions associated with anionic pigment dispersant, and also can include optional ink additives such as anionic polymers and surfactants, and added salts.

In one embodiment of the present invention, the second cationic species is predominately $K^+$. In another embodiment, the second cationic species consists essentially of $K^+$ only.

The cations present in the pigmented inks can be measured by standard methods such as ion chromatography with a cation-exchange column (for example, a CS12A column from Dionex Corp., Sunnyvale, Calif.), and inductively coupled plasma optical emission spectroscopy (ICP/OES)

with, for example, a commercially available instrument such as a PE Optima (Perkin Elmer Life and Analytical Sciences, Shelton, Conn.).

Prior to analysis the pigment is removed from the ink by precipitating with the addition of hydrochloric acid. The precipitated pigment is separated by ultracentrifugation and the resulting clear supernatant is analyzed for cations.

Ink Properties

Jet velocity, separation length of the droplets, drop size and stream stability are greatly affected by the surface tension and the viscosity of the ink. Pigmented ink jet inks typically have a surface tension in the range of about 20 mN·m−1 to about 70 mN·m−1 at 25° C. Viscosity can be as high as 30 mPa·s at 25° C., but is typically somewhat lower. The ink has physical properties compatible with a wide range of ejecting conditions, materials construction and the shape and size of the nozzle. The inks should have excellent storage stability for long periods so as not clog to a significant extent in an ink jet apparatus. Further, the ink should not corrode parts of the ink jet printing device it comes in contact with, and it should be essentially odorless and non-toxic.

Although not restricted to any particular viscosity range or printhead, the inventive ink is particularly suited to lower viscosity applications. Thus the viscosity (at 25° C.) of the inventive inks can be less than about 7 mPa·s, or less than about 5 mPa·s, and even, advantageously, less than about 3.5 mPa·s. Thermal inkjet actuators rely on instantaneous heating/bubble formation to eject ink drops and this mechanism of drop formation generally requires inks of lower viscosity. As such, the instant inks can be particularly advantages in thermal printheads.

Ink Sets

Inkjet inks are generally used in sets. An ink set comprises at least two differently colored inks, more typically at least three differently colored inks such as cyan, magenta, and yellow (CMY), and more commonly at least four differently colored inks such as cyan, magenta, yellow, and black (CMYK). An ink set may employ one or more inks as described herein above.

In addition to the typical CMYK inks, ink sets may further comprise one or more "gamut-expanding" inks, including different colored inks such as an orange ink, a green ink, a red ink and/or a blue ink, and combinations of full strength and light strengths inks such as light cyan and light magenta.

Method of Printing

The inks of the present invention can be printed with any suitable inkjet printer. The substrate can be any suitable substrate including plain paper, such as common electrophotographic copier paper; treated paper, such as photo-quality inkjet paper; textile; and non-porous substrates including polymeric films such as polyvinyl chloride and polyester.

The following examples illustrate the invention without, however, being limited thereto.

EXAMPLES

Inks in the examples that follow were prepared by adding the indicated formulation ingredients to the dispersion(s), with mixing, and filtering through a 2.5 micron filter to remove any oversize material. The water was deionized unless otherwise stated. Ingredient amounts are in weight percent of the total weight of ink. Surfynol® 465 is a surfactant from Air Products (Allentown, Pa., USA). Dantocol® DHE is di-(2-hydroxyethyl)-5,5-dimethylhydantoin (CAS No. 26850-24-8) from Lonza, Inc. (Allendale, N.J., USA).

Polymer 1

Polymer 1 was a block copolymer of methacrylic acid//benzyl methacrylate//ethyltriethyleneglycol methacrylate (13//15//4). It was prepared in a manner similar to "preparation 4" described in U.S. Pat. No. 5,519,085, except the monomer levels were adjusted to give the ratio indicated. The neutralizing agent was potassium hydroxide.

Polymer 2

Polymer 2 was a block co-polymer of benzyl methacrylate and methacrylic acid (13//10) that was neutralized with KOH. An exemplary preparative method is provided in U.S. Pat. No. 6,087,416 under the heading "Dispersant Polymer 1".

Dispersion 1

Dispersion 1 was a dispersion of carbon black pigment stabilized with Polymer 1 as the dispersant. It was prepared in a manner similar to Example 3 in U.S. Pat. No. 5,519,085. The pigment content was adjusted to be 15% by weight.

Dispersion 2

Dispersion 2 was a cyan dispersion of PB 15:4 pigment stabilized with Polymer 2 as the dispersant. The pigment was milled with the dispersant in a 2-roll mill (pigment/dispersant weight ratio of 1.5) and the resulting chip was let down into water to make a concentrated dispersion with 15% by weight pigment.

Dispersion 3

Dispersion 3 was a magenta dispersion of PR 122 pigment stabilized with Polymer 2 as the dispersant. The pigment was milled with the dispersant in a 2-roll mill (pigment/dispersant weight ratio of 1.5) and the resulting chip was let down into water to make a concentrated dispersion with 15% by weight pigment.

Dispersion 4

Dispersion 4 was a yellow dispersion of PY 128 pigment stabilized with Polymer 2 as the dispersant. The pigment was milled with the dispersant in a 2-roll mill (pigment/dispersant weight ratio of 1.22) and the resulting chip was let down into water to make a concentrated dispersion with 15% by weight pigment.

Optical Density

Inks were printed with a Canon i560 printer at 100% coverage onto HP office, Xerox 4024 and Hammermill Copy Plus plain papers. The reported optical density (OD) and chroma values are an average of the three papers as measured with a Greytag Macbeth Spectrolino spectrometer.

Cation Analytical Method

Prior to analysis the pigment was removed from the ink by precipitation with added hydrochloric acid. The precipitated pigment was separated by ultracentrifugation and the resulting clear supernatant was analyzed for the cations by inductively coupled plasma optical emission spectroscopy (ICP/OES) using PE Optima instrumentation (Perkin Elmer Life and Analytical Sciences, Shelton, Conn.).

This ICP method was able to detect the lithium, sodium, potassium and rubidium with a sensitivity of about 2 ppm. Cesium was not detected accurately and any reported concentrations were calculated based on the formulation. Ammonium concentrations were also calculated based on the formulation as ICP is suitable only for the metallic ions.

Cation levels are reported in two ways, on a weight basis as parts per million (ppm) cation in total ink and on a molar basis as micromoles (μmol) of cation per gram of SDP (g-SDP). A micromole is $10^{-6}$ mole. The calculation for μmol of cation per g-SDP is (100)(cation ppm)/(wt % SDP)(cation molecular weight).

From the given weight percent of SDP in the inks, μmol of cation per g-SDP can be converted to moles of cation per unit weight of ink (units specified in the claims). However, for purposes of calculating the molar ratio M1/Mtot, conversion is unnecessary as the units cancel and the ratio is the same.

In the examples, cation ppm levels shown with parentheses "( )" are calculated values based on formulation while those shown without parentheses are measured.

Latency Test

Latency (Decap time) was determined according to the following procedure using a Hewlett Packard 850 printer that was altered so that the ink cartridge would not be serviced during the test. Just prior to the beginning of the test, the nozzles were primed and a nozzle check pattern was performed to ensure all nozzles were firing acceptably. No further servicing was then conducted During each scan across the page, the pen prints a pattern of 149 vertical lines spaced about 1/16 inch apart. Each vertical line was formed by all nozzles firing one drop, therefore the line is one drop wide and about ½ inch high corresponding to the length of the nozzle array on the printhead. The first vertical line in each scan is the first drop fired from each nozzle after the prescribed latency period, the fifth line was the fifth drop from each nozzle on that scan, and so forth for all 149 lines.

The pattern was repeated at increasingly longer time intervals (decap times) between scans. The standard time intervals between scans was 1, 2, 3, 4, 5, 6, 7, 8, 9, 10, 20, 30, 40, 50, 60, 70, 80, 90 100, 200, 300, 400, 500, 600, 700, 800, 900, and 1000 seconds. Nothing beyond 1000 seconds was attempted.

Upon completion of the test, the $1^{st}$, $5^{th}$, and $32^{nd}$ vertical lines in each scan was examined for consistency, misdirected drop deposits, and clarity of the print. These lines correspond to the $1^{st}$, $5^{th}$ and $32^{nd}$ drops of ink droplets ejected from the nozzle after a prescribed latency period. The decap time was the longest time interval where the particular vertical line can be printed without significant defects.

Preferably, the pen will fire properly on the first drop. However, when the first drop fails to eject properly, the decap time for the fifth and thirty-second drops can provide some information as to the severity of the pluggage and how easily the nozzles can be recovered.

The results tables hereinafter report only the first drop decap time and refer to the value simply as the "Decap Time" in units of seconds.

Example 1

The inks of this example, summarized in the tables that follow, demonstrate the benefits of a mixture of lithium and potassium cations wherein the cation ratio is achieved by a mixture of Dispersion 1 with potassium counter-ions and lithium acetate additive. At optimum cation ratios, greatly enhanced decap is obtained.

The low levels of sodium noted come from NaOH impurity in the KOH used to neutralize the dispersant polymer.

|  | Ink 1A (Control) | Ink 1B | Ink 1C | Ink 1D | Ink 1e |
|---|---|---|---|---|---|
| | | Ingredients | | | |
| Dispersion 1 (as % pigment) | 3.5 | 3.5 | 3.5 | 3.5 | 3.5 |
| Lithium acetate | — | 0.1 | 0.15 | 0.2 | 0.25 |
| Diethylene glycol | 10 | 10 | 10 | 10 | 10 |
| 2-pyrrolidone | 10 | 10 | 10 | 10 | 10 |
| Surfynol 465 | 0.2 | 0.2 | 0.2 | 0.2 | 0.2 |
| Water (Balance to 100%) | Bal. | Bal. | Bal. | Bal. | Bal. |
| | | Physical Properties | | | |
| Conductivity (mS/cm) | 0.95 | 0.98 | 1.92 | 1.61 | 2.44 |
| pH | 8.01 | 7.91 | 7.72 | 7.73 | 7.60 |
| | | Cation content | | | |
| Potassium (ppm) | 1878 | (1878) | (1878) | 1872 | (1878) |
| Sodium (ppm) | 78 | (78) | (78) | 112 | (78) |
| Lithium (ppm) | — | (133) | (200) | 230 | (333) |

|  | Ink 1A (Control) | Ink 1B | Ink 1C | Ink 1D | Ink E |
|---|---|---|---|---|---|
| | | Print Properties | | | |
| Decap Time (sec.) | 60 | 300 | 900 | >1,000 | 100 |
| Optical Density | 0.77 | 0.76 | 0.83 | 0.76 | 0.82 |
| | | Cation Ratios | | | |
| Potassium (µmol/g-pig.) | 1376 | 1376 | 1376 | 1371 | 1376 |
| Sodium (µmol/g-pig.) | 97 | 97 | 97 | 139 | 97 |
| Lithium (µmol/g-pig.) | — | 543 | 816 | 939 | 1359 |
| Mtot (µmol/g-pig.) | 1473 | 2016 | 2289 | 2449 | 2832 |
| Ratio (%) M1/Mtot | 0 | 27 | 36 | 38 | 48 |

Example 2

The inks of this example, summarized in the tables that follow, are similar to Example 1 except that the dispersion is Dispersion 2. Again, at optimum cation ratios, greatly enhanced decap is obtained.

|  | Ink 2A (Control) | Ink 2B | Ink 2C | Ink 2D | Ink 2E |
|---|---|---|---|---|---|
| | | Ingredients | | | |
| Dispersion 2 (as % pigment) | 3.0 | 3.0 | 3.0 | 3.0 | 3.0 |
| Lithium acetate | — | 0.1 | 0.15 | 0.2 | 0.25 |
| Diethylene glycol | 10 | 10 | 10 | 10 | 10 |
| 2-pyrrolidone | 10 | 10 | 10 | 10 | 10 |
| Surfynol 465 | 0.2 | 0.2 | 0.2 | 0.2 | 0.2 |
| Water (balance to 100%) | Bal. | Bal. | Bal. | Bal. | Bal. |
| | | Physical Properties | | | |
| Conductivity (mS/cm) | 1.24 | 1.44 | 3.18 | 4.28 | 4.41 |
| pH | 8.49 | 8.46 | 7.06 | 8.06 | 6.95 |
| | | Cation content | | | |
| Potassium (ppm) | (2140) | (2140) | 2140 | 2140 | (2140) |
| Sodium (ppm) | (40) | (40) | 39 | 41 | (40) |
| Lithium (ppm) | — | (105) | 146 | 189 | (263) |
| | | Print Results | | | |
| Decap Time (sec.) | 40 | 40 | >1,000 | >1,000 | 60 |
| Optical Density | 0.75 | 0.75 | 0.77 | 0.78 | 0.76 |
| Chroma | 47 | 47 | 49 | 49 | 48 |
| | | Cation ratios | | | |
| Potassium (µmol/g-pig.) | 1568 | 1568 | 1568 | 1568 | 1568 |
| Sodium (µmol/g-pig.) | 50 | 50 | 48 | 51 | 50 |
| Lithium (µmol/g-pig.) | — | 432 | 596 | 771 | 1082 |

-continued

| | Ink 2A (Control) | Ink 2B | Ink 2C | Ink 2D | Ink 2E |
|---|---|---|---|---|---|
| Mtot (µmol/g-pig.) | 1618 | 2050 | 2212 | 2390 | 2700 |
| Ratio (%) M1/Mtot | 0 | 21 | 27 | 32 | 40 |

Example 3

The inks of this example, summarized in the tables that follow, are similar to Examples 1 and 2 except that the dispersion is Dispersion 3. Again, at optimum cation ratios, greatly enhanced decap is obtained. As seen, the magnitude of decap improvement is sensitive to vehicle. In this case, humectant levels giving more favorable decap are different than those of the previous examples.

| | Ink 3A (Control) | Ink 3B | Ink 3C | Ink 3D |
|---|---|---|---|---|
| Ingredients | | | | |
| Dispersion 3 | 3.0 | 3.0 | 3.0 | 3.0 |
| Lithium acetate | — | 0.1 | 0.2 | 0.4 |
| Diethylene glycol | 10 | 10 | 10 | 10 |
| 2-pyrrolidone | 10 | 10 | 10 | 10 |
| Surfynol 465 | 0.2 | 0.2 | 0.2 | 0.2 |
| Water (to 100%) | Balance | Balance | Balance | Balance |
| Physical Properties | | | | |
| Conductivity (mS/cm) | 1.27 | 2.45 | 2.63 | 3.68 |
| pH | 7.84 | 8.65 | 8.54 | 7.42 |
| Cation content | | | | |
| Potassium (ppm) | (2280) | (2280) | 2280 | 2280 |
| Sodium (ppm) | (60) | (60) | 60 | (60) |
| Lithium (ppm) | — | (105) | 210 | (420) |
| Print Results | | | | |
| Decap Time (sec.) | 40 | 60 | 70 | 40 |
| Optical Density | 0.70 | 0.69 | 0.70 | 0.67 |
| Chroma | 54 | 53 | 54 | 52 |
| Cation Molar Ratios | | | | |
| Potassium (µmol/g-pig.) | 1949 | 1949 | 1949 | 1949 |
| Sodium (µmol/g-pig.) | 87 | 87 | 87 | 87 |
| Lithium (µmol/g-pig.) | — | 500 | 1000 | 2000 |
| Mtot (µmol/g-pig.) | 2036 | 2536 | 3036 | 4036 |
| Ratio (%) M1/Mtot | 0 | 20 | 33 | 50 |

| | Ink 3E | Ink 3F | Ink 3G |
|---|---|---|---|
| Ink ingredients | | | |
| Dispersion 3 (as % pigment) | 3.0 | 3.0 | 3.0 |
| Lithium acetate | 0.25 | 0.25 | 0.25 |
| Diethylene glycol | 12 | 14 | 16 |
| 2-pyrrolidone | 8 | 6 | 4 |
| Surfynol 465 | 0.2 | 0.2 | 0.2 |
| Water (balance to 100%) | Bal. | Bal. | Bal. |
| Physical Properties | | | |
| Conductivity (mS/cm) | 3.40 | 1.27 | 2.45 |
| pH | 7.77 | 7.84 | 8.65 |
| Cation Content | | | |
| Potassium (ppm) | 2280 | (2280) | (2280) |
| Sodium (ppm) | 60 | (60) | (60) |
| Lithium (ppm) | 240 | (240) | (240) |
| Printing Results | | | |
| Decap Time (sec.) | 500 | 400 | 400 |
| Optical Density | 0.71 | 0.71 | 0.69 |
| Chroma | 53 | 54 | 53 |
| Cation Molar Ratio | | | |
| Potassium (µmol/g-pig.) | 1949 | 1949 | 1949 |
| Sodium (µmol/g-pig.) | 88 | 88 | 88 |
| Lithium (µmol/g-pig.) | 1143 | 1143 | 1143 |
| Mtot (µmol/g-pig.) | 3180 | 3180 | 3180 |
| Ratio (%) M1/Mtot | 36 | 36 | 36 |

Example 4

The inks of this example, summarized in the tables that follow, are similar to Examples 1-3 except that the dispersion is Dispersion 4. Again, at optimum cation ratios, greatly enhanced decap is obtained.

| | Ink 4A (Control) | Ink 4B | Ink 4C | Ink 4D |
|---|---|---|---|---|
| Ingredients | | | | |
| Dispersion 4 | 3.0 | 3.0 | 3.0 | 3.0 |
| Lithium acetate | — | 0.1 | 0.25 | 0.5 |
| Diethylene glycol | 10 | 10 | 10 | 10 |
| 2-pyrrolidone | 10 | 10 | 10 | 10 |
| Surfynol 465 | 0.2 | 0.2 | 0.2 | 0.2 |
| Water (balance to 100%) | Bal. | Bal. | Bal. | Bal. |
| Physical Properties | | | | |
| Conductivity (mS/cm) | 2.38 | 2.81 | 4.57 | 6.82 |
| pH | 7.53 | 7.35 | 7.01 | 6.95 |
| Cation Content | | | | |
| Potassium (ppm) | (2686) | 2540 | 2829 | (2686) |
| Sodium (ppm) | (45) | 44 | 47 | (45) |
| Lithium (ppm) | — | 102 | 253 | (526) |
| Print Properties | | | | |
| Decap Time (sec.) | 40 | 50 | 500 | 10 |
| Optical Density | 0.78 | 0.79 | 0.78 | 0.80 |
| Chroma | 56 | 57 | 56 | 56 |
| Cation Molar Ratio | | | | |
| Potassium (µmol/g-pig.) | 2295 | 2171 | 2295 | 2418 |
| Sodium (µmol/g-pig.) | 67 | 64 | 68 | 67 |
| Lithium (µmol/g-pig.) | — | 486 | 1205 | 2400 |
| Mtot (µmol/g-pig.) | 2362 | 2721 | 3568 | 4885 |
| Ratio (%) M1/Mtot | 0 | 18 | 34 | 49 |

Example 5

The inks of this example, summarized in the tables that follow, demonstrate addition of ammonium acetate to inks similar to those of Example 1. As seen, very high decap time was achieved but the optimum M1/Mtot ratio shifted relative to the parent inks containing no ammonium.

| | Ink 5A | Ink 5B | Ink 5C |
|---|---|---|---|
| Ingredients | | | |
| Dispersion 1 (as % pigment) | 3.5 | 3.5 | 3.5 |
| Ammonium acetate | 0.025 | 0.05 | 0.075 |
| Lithium acetate | 0.05 | 0.10 | 0.15 |
| Diethylene glycol | 10 | 10 | 10 |
| 2-pyrrolidone | 10 | 10 | 10 |
| Surfynol 465 | 0.2 | 0.2 | 0.2 |
| Water (balance to 100%) | Bal. | Bal. | Bal. |

-continued

|  | Ink 5A | Ink 5B | Ink 5C |
|---|---|---|---|
| Physical Properties | | | |
| Conductivity (mS/cm) | 1.55 | 2.03 | 2.47 |
| pH | 7.81 | 7.65 | 7.56 |
| Cation content | | | |
| Potassium (ppm) | 2003 | 2003 | 2003 |
| Ammonium (ppm) | (58) | (117) | (175) |
| Lithium (ppm) | 61 | 122 | 183 |
| Sodium (ppm) | 107 | 107 | 107 |
| Print Properties | | | |
| Decap Time (sec.) | 70 | >1,000 | 300 |
| Optical Density | 0.80 | 0.80 | 0.81 |
| Cation Molar Ratio | | | |
| Potassium (μmol/g-SDP) | 1467 | 1467 | 1467 |
| Ammonium (μmol/g-SDP) | 93 | 185 | 278 |
| Lithium (μmol/g-SDP) | 216 | 498 | 649 |
| Sodium (μmol/g-SDP) | 133 | 133 | 133 |
| Mtot (μmol/g-SDP) | 1816 | 2098 | 2249 |
| Ratio (%) M1/Mtot | 12 | 24 | 29 |

Example 6

Comparative

The inks of this example, summarized in the tables that follow, are similar to the inks of Example 1 except ammonium is used in place of lithium. As seen, without lithium, the very high decap of Example 1 was not obtained, although there did appear to be a maxima at an $NH_4^+$/Mtot ratio of about 21% ($NH_4^+$ was included in Mtot for this comparative example).

|  | Ink 6A (Comp.) | Ink 6B (Comp.) | Ink 6C (Comp.) | Ink 6D (Comp.) |
|---|---|---|---|---|
| Ingredients | | | | |
| Dispersion 1 (as % pigment) | 3.5 | 3.5 | 3.5 | 3.5 |
| Ammonium acetate | 0.05 | 0.075 | 0.1 | 0.2 |
| 2-pyrrolidinone | 10.0 | 10.0 | 10.0 | 10.0 |
| Diethylene glycol | 10.0 | 10.0 | 10.0 | 10.0 |
| Surfynol 465 | 0.2 | 0.2 | 0.2 | 0.2 |
| Water (to 100%) | Bal. | Bal. | Bal. | Bal. |
| Physical Properties | | | | |
| Conductivity (mS/cm) | 1.37 | 1.54 | 1.72 | 2.32 |
| pH | 7.83 | 7.82 | 7.77 | 7.67 |

|  | Ink 6A | Ink 6B | Ink 6C | Ink 6D |
|---|---|---|---|---|
| Print Properties | | | | |
| Decap Time (sec.) | 40 | 50 | 400 | 20 |
| Optical Density | 0.78 | 0.80 | 0.79 | 0.81 |
| Cation Molar Ratio | | | | |
| Ammonium (μmol/g-pig.) | (185) | (278) | (370) | (740) |
| Sodium (μmol/g-pig.) | (97) | (97) | (97) | (97) |
| Potassium (μmol/g-pig.) | (1376) | (1376) | (1376) | (1376) |
| Mtot (μmol/g-pig.) | 1658 | 1701 | 1793 | 2163 |
| Ratio (%) $NH_4^+$/Mtot | 11 | 16 | 21 | 34 |

Example 7

Comparative

The inks of this example, summarized in the tables that follow, are similar to the inks of Example 1 except Tetrabutylammonium (as the hydroxide) is used in place of lithium as the first cation. As seen, very high decap of was not achieved. (Tetrabutylammonium was included in Mtot for this comparative example).

|  | Ink 7A (Comp.) | Ink 7B (Comp.) | Ink 7C (Comp.) |
|---|---|---|---|
| Ingredients | | | |
| Dispersion 1 (as % pigment) | 3.5 | 3.5 | 3.5 |
| Tetrabutylammonium hydroxide | 0.02 | 0.05 | 0.1 |
| Diethylene glycol | 10 | 10 | 10 |
| 2-pyrrolidone | 10 | 10 | 10 |
| Surfynol 465 | 0.2 | 0.2 | 0.2 |
| Water (to 100%) | Balance | Balance | Balance |
| Physical Properties | | | |
| Conductivity (mS/cm) | 0.98 | 1.25 | 1.27 |
| pH | 7.70 | 7.72 | 7.81 |
| Cation content | | | |
| Potassium (ppm) | (1878) | (1878) | (1878) |
| Sodium (ppm) | (78) | (78) | (78) |
| Tetrabutylammonium ($Bu_4N^+$) (ppm) | (214) | (535) | (1070) |

|  | Ink 7A | Ink 7B | Ink 7C |
|---|---|---|---|
| Print Properties | | | |
| Decap Time (sec.) | 40 | 50 | 70 |
| Optical Density | 0.95 | 0.97 | 0.94 |
| Cation Ratios | | | |
| Potassium (μmol/g-pig.) | 1376 | 1376 | 1376 |
| Sodium (μmol/g-pig.) | 97 | 97 | 97 |
| $Bu_4N^+$ (μmol/g-pig.) | 24 | 60 | 120 |
| Mtot (μmol/g-pig.) | 1497 | 1533 | 1593 |
| Ratio (%) $Bu_4N^+$/Mtot | 1.6 | 3.9 | 7.5 |

Example 8

Comparative

The inks of this example, summarized in the tables that follow, use sodium and potassium salts as additives with potassium-neutralized polymer stabilized dispersion. As seen, very high decap of the inventive ink was not achieved.

|  | Ink 8A (Comp.) | Ink 8B (Comp.) | Ink 8C (Comp.) | Ink 8D (Comp.) |
|---|---|---|---|---|
| Ingredients | | | | |
| Dispersion 1 (as % pigment) | 3.5 | 3.5 | 3.5 | 3.5 |
| Sodium hydroxide | 0.05 | 0.1 | 0.2 | — |
| Potassium benzoate | — | — | — | 0.23 |
| Diethylene glycol | 10 | 10 | 10 | 10 |
| 2-pyrrolidone | 10 | 10 | 10 | 10 |
| Surfynol 465 | 0.2 | 0.2 | 0.2 | 0.2 |
| Water (balance to 100%) | Bal. | Bal. | Bal. | Bal. |
| Physical Properties | | | | |
| Conductivity (mS/cm) | 1.04 | 2.22 | 4.38 | 1.53 |
| pH | 10.7 | 12.2 | 12.3 | 7.9 |

|  | Ink 8A | Ink 8B | Ink 8C | Ink 8D |
|---|---|---|---|---|
| Print Properties | | | | |
| Decap Time (secs) | 30 | 30 | 30 | 40 |
| Optical Density | 0.79 | 0.80 | 0.78 | 0.81 |

-continued

| | | Cation Molar ratio | | |
|---|---|---|---|---|
| Sodium (μmol/g-pig.) | (454) | (811) | (1525) | (97) |
| Potassium (μmol/g-pig.) | (1376) | (1376) | (1376) | (1786) |
| Lithium (μmol/g-pig.) | — | — | — | — |
| Mtot (μmol/g-pig.) | 1830 | 2187 | 2901 | 1883 |
| Ratio (%) M1/Mtot | 24 | 37 | 52 | 5 |

Example 9

The inks of this example, summarized in the tables that follow, are similar to Ink 1 D of Example 1, except the humectants were varied. As seen, the humectant selection and level can have a significant effect on the magnitude of decap improvement achieved with a given M1/M2 ratio.

| | Ink 9A | Ink 9B | Ink 9C | Ink 9D | Ink 9E | Ink 9F |
|---|---|---|---|---|---|---|
| Ink Ingredients | | | | | | |
| Dispersion 1 (as % pigment) | 3.5 | 3.5 | 3.5 | 3.5 | 3.5 | 3.5 |
| Lithium acetate | 0.2 | 0.2 | 0.2 | 0.2 | 0.2 | 0.2 |
| Diethylene glycol | 20 | 15 | 5 | — | 10 | 10 |
| 2-pyrrolidone | — | 5 | 15 | 20 | 20 | — |
| Dantocol DHE | — | — | — | — | — | 10 |
| Surfynol 465 | 0.2 | 0.2 | 0.2 | 0.2 | 0.2 | 0.2 |
| Water (to 100%) | Bal. | Bal. | Bal. | Bal. | Bal. | Bal. |
| Physical Properties | | | | | | |
| Conductivity (mS/cm) | 2.20 | 2.53 | 2.48 | 2.24 | 3.20 | 2.18 |
| pH | 7.57 | 7.46 | 7.57 | 7.73 | 7.66 | 7.54 |
| Print Results | | | | | | |
| Decap Time (sec.) | 70 | 300 | 400 | 70 | >1,000 | 90 |
| Optical Density | 0.90 | 0.88 | 0.88 | — | 0.94 | — |

The invention claimed is:

1. An ink-jet ink comprising an aqueous vehicle, a colorant, and a first and a second cationic species wherein:
   i) said colorant comprises a pigment stabilized to a dispersion in said aqueous vehicle with an anionic polymeric dispersant;
   ii) said first cationic species is Li$^+$ and has a molar concentration per unit weight of ink of M1;
   iii) said second cationic species is any member or any combination of members selected from the group consisting of Na$^+$, K$^+$, Rb$^+$ and Cs$^+$, and has a molar concentration per unit weight of ink of M2; and
   iv) the molar ratio of the first cationic species to the total cation concentration (Mtot) satisfies equation 1 as follows:

$$0.20 < M1/Mtot < 0.45 \quad (\text{eq. 1})$$

wherein Mtot is the cumulative molar concentration of the first and second cationic species per unit weight of ink (Mtot=M1+M2).

2. The ink of claim 1 further comprising a first humectant consisting of 2-pyrrolidone and a second humectant selected from any member or combination of members of the group consisting of ethylene glycol, diethylene glycol and triethylene glycol.

3. The inkjet ink of claim 1 wherein the pH is greater than about 6.5.

4. The ink of claim 1 wherein the anionic dispersant is comprised of anionic moieties consisting essentially of carboxyl groups.

5. An ink according to any of claims 1-4 wherein the second cationic species is predominately K$^+$.

6. The ink of claim 1 further comprising ammonium cations.

7. The ink of claim 1 characterized in that the decap time is equal to or longer than 40 seconds, wherein the decap time is defined as the amount of time an inkjet printhead, loaded with an ink, can be left uncapped and idle and still fire a drop of that ink without misdirection, loss of color or unacceptable decrease of velocity.

8. The ink of claim 2 comprising first humectant in a range of about 2 wt % to about 30 wt % and second humectant in the range of about 2 wt % to about 30 wt %, the percentages being based on the total weight of ink.

9. An inkjet ink according to any of the preceding claims wherein the colorant consists essentially of pigment stabilized to dispersion in the aqueous vehicle with an anionic dispersant.

10. The inkjet ink according to any of the preceding claims wherein the colorant is carbon black pigment.

* * * * *